(12) United States Patent
Salgar et al.

(10) Patent No.: US 8,675,074 B2
(45) Date of Patent: Mar. 18, 2014

(54) CUSTOM VIDEO COMPOSITES FOR SURVEILLANCE APPLICATIONS

(75) Inventors: Mayur Salgar, Karnataka (IN); Marinc Drive, Karnataka (IN); Deepakumar Subbian, Karnataka (IN); Mahesh N. Jayappa, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1497 days.

(21) Appl. No.: 11/780,751

(22) Filed: Jul. 20, 2007

(65) Prior Publication Data

US 2009/0021583 A1 Jan. 22, 2009

(51) Int. Cl.
*H04N 7/18* (2006.01)

(52) U.S. Cl.
USPC .......................................... 348/159; 348/143

(58) Field of Classification Search
USPC ......................................................... 348/159
See application file for complete search history.

(56) References Cited

U.S. PATENT DOCUMENTS

| | | | |
|---|---|---|---|
| 6,330,025 B1 * | 12/2001 | Arazi et al. ................... | 348/143 |
| 6,701,030 B1 * | 3/2004 | Uyttendaele et al. ......... | 382/284 |
| 6,788,333 B1 | 9/2004 | Uyttendaele et al. | |
| 7,006,706 B2 | 2/2006 | Sobel et al. | |
| 7,154,938 B2 | 12/2006 | Cumeralto et al. | |
| 2003/0053658 A1 * | 3/2003 | Pavlidis ........................ | 382/103 |
| 2003/0159143 A1 * | 8/2003 | Chan ............................. | 725/41 |
| 2006/0239645 A1 | 10/2006 | Curtner et al. | |
| 2007/0024706 A1 * | 2/2007 | Brannon et al. .............. | 348/142 |
| 2007/0122786 A1 * | 5/2007 | Relan et al. ................... | 434/308 |
| 2008/0129844 A1 * | 6/2008 | Cusack et al. ................ | 348/241 |

* cited by examiner

*Primary Examiner* — Rupal Dharia
*Assistant Examiner* — Joe Chacko
(74) *Attorney, Agent, or Firm* — Husch Blackwell LLP

(57) ABSTRACT

A video surveillance system includes a plurality of video sources, where each video source is arranged to monitor and acquire video surveillance data within a field of view (FOV), a video manager connected to each of the plurality of video sources to control the video sources and to process video surveillance data acquired therefrom and a user interface connected to the video manager that allows an end-user to observe the FOVs from each of the plurality of video sources, and identify a region of interest (ROI) within particular FOVs to dynamically render a composite FOV comprising the ROIs from the particular FOVs. Where a video source includes enhanced abilities, such as a mega-pixel camera or video source, the enhanced video source may forward, instead of video data for the entire FOV, only that video dated from the selected ROI to realize reduced network traffic for more optimal video surveillance applications.

17 Claims, 6 Drawing Sheets

CUSTOM VIDEO COMPOSITES FOR SURVEILLANCE APPLICATIONS

BACKGROUND OF THE INVENTION

The present invention relates to security systems, and more particularly relates to custom video composites and use within video surveillance systems, automated methods and software application tools for video surveillance.

Video surveillance systems are known for use in a variety of applications for monitoring objects within an environment, e.g., a piece of baggage in an airport or a casino employee within a gambling establishment. Video surveillance has long been employed in the aviation industry to monitor the presence of individuals at key locations within an airport, such as at security gates, baggage area, parking garages, etc. Analog closed circuit television (CCTV) and more recently available digital, network-based video surveillance systems are employed to monitor and/or track individuals and objects, vehicles entering or leaving a building facility or security gate (entry/exit), individuals present within, entering/exiting a store, casino, office building, hospital, etc., or other known settings where the health and/or safety of the occupants may be of concern.

Video servers, or servers that provide video analytics functionality, may be included in a video surveillance system or network in order to process video provided by the network cameras. Video servers may be used in video management systems to operate upon analog CCTV video data, such operations including digitization, rasterization and processing by video analytics. Such video servers thereafter direct the video data streams to in-network or IP address locations. A single video server may network up to four analog cameras, converting the analog stream to frames of digital image data. Network or IP Cameras with on-board video analytics processing abilities shall be referred to herein as "smart IP cameras." Smart IP cameras allow for video analytics to be performed at the source of video data acquisition, that is, at the camera.

Video analytics as used herein shall refer to functional operations performed on acquired video data by software or application programs that employ algorithms to detect and classify objects in a field of view. The phrase "network camera" as used herein includes any known video capture or image acquisition devices, including digital cameras, digital video recorders, analog CCTV cameras, etc. Digital network cameras perform many of the same functions performed by conventional analog CCTV cameras, but with greater functionality and reduced costs. Network cameras are typically interfaced directly into an Ethernet-based network at an Ethernet port through a video server (as mentioned above). Network camera video outputs may be viewed in their simplest form using a web browser at a PC (and PC monitor).

Video analytics are used in various video-monitoring systems to enhance the effectiveness of video monitoring for event and object detection. Video analytics include functions for implementing computer vision operations for monitoring and analyzing streaming video from video acquisition devices comprising a monitoring network. Known video analytics provide object-tracking features by which an object under surveillance is tracked or monitored by a camera. For example, based on the video monitoring, an alarm is generated if an object under surveillance at a fixed location is removed from the location, as seen by the acquired video or still images. Various entities are known that provide video analytics software application for video monitoring applications. For example, IOImage, Inc., provides video analytics solutions marketed Intelligent Video Appliances,™ that performs various security-monitoring functions. Several functions include intrusion detection by video surveillance, unattended baggage detection, stopped vehicle detection, and other video analytics functions such as autonomous person/vehicle tracking with pan/tilt/zoom (PZT).

US Patent Application No. 2006/0239645 ("the '645 application"), commonly owned and incorporated by reference in its entirety herein, discloses an enterprise video surveillance system that includes video analytics abilities. In particular, the surveillance system and operation disclosed and described in the '645 application includes the "packaging" of video sequences derived from network cameras based on user-specified events. A video analytics processing manager, or Digital Video Manager™ ("VM"), provides that portions of acquired video, e.g., acquired video sequences, are bound into a "package" containing the portion or event of interest captured by a network video camera. The packaged video sequences or events are transmitted by the VM to other processes for further analysis, or for viewing by external agents or operators at a central security system monitoring location. One example of a "packaged" video event might include a video clip containing facial images of an individual under surveillance, or the faces of all individuals entering/exiting a secure location. By packaging, the pertinent video of subjects or events under surveillance is readily accessible so that prompt security agent or operator action may be taken in response to monitored events, or monitored subject action.

A block diagram highlighting a network-based video management system 100 found in the '645 application is reproduced herein as FIG. 1. As shown in FIG. 1, video management system 100 employs a number of digital video system sensors (DVSS's) 110, that are electrically connected to a LAN, or WAN 120. Browsers or terminal stations 150, and user interfaces 160 (e.g., graphical user interfaces) are included and connected to the WAN/LAN 120 to allow user input and control of system functioning, e.g., controlling camera PTZ settings, ROI settings, image resolution, frame rate, etc. DVSS's 110 are described by the '645 application to include any known analog and digital alarm event acquisition or detection devices, e.g., tripwires, digital network cameras, analog CCTV cameras, acoustic sensors, motion sensors, etc., that detect alarm events and acquire alarm-event detection data. For example, a network camera may acquire sequences of video surveillance data for distribution throughout the system (100), e.g., to a central video monitoring location.

A video manager (VM) 170 is connected through LAN/WAN to a network server 140 to control DVSS and other system operations. DVSSs may be connected to the LAN/WAN structure 120 directly, through a host application software program 180, or both. Acquired video images are processed by the VM to task the appropriate appliance modules 190. If an alarm event is detected and video-captured, the VM 170 processes the alarm event and acquired video data, and provides processing results for operator access (e.g., viewing) at a user interface 160, or terminal monitor 195. Video images of the actions that trigger such events are optionally stored on a hard-drive, magnetic tape, or other storage medium (not shown in FIG. 1), allowing video replay.

Typically, such video surveillance systems include multiple video cameras located at multiple locations within a secured premises or perimeter. As such, operators or security personnel frequently monitor multiple views derived from multiple cameras. To do so efficiently, conventional video surveillance and security monitoring systems and applications use salvo views, which is a matrix or set of network camera views. The individual views, or viewing ports comprising the matrix or salvo view each comprise video data captured by a respective video or network camera. Typically, monitoring operators wish to monitor related regions within separate fields of view (FOVs) that are monitored by separate network cameras within a protected premises. As such, when an operator attempts to view an incident or detected alarm event across currently displayed camera views, he/she is forced to analyze every camera view in the salvo or matrix display.

So while conventional salvo or matrix view techniques for monitoring multiple FOVs may provide for viewing the video acquired at any one of the monitored FOVs, such systems and salvo operation falls short in other important monitoring tasks and operations. Known salvo or matrix view monitoring systems and application tools do not provide a single view port to monitor multiple regions of interests (ROIs) in a single contained view or viewing port. Intuitively, operators whose job it is to monitor video acquired of from network cameras with fixed FOVs can best determine which ROIs in particular FOVs are most important for monitoring, and are believed to be the best arbiters of which ROIs would most improve efficiency and effectiveness if provided in one composite video view or viewing port. What would be welcomed therefore, in the field of video monitoring and video surveillance systems is a video monitoring system, method and application software program that allow manual user input so that the operator can identify particular ROIs within streaming video or still shots acquired by cameras, e.g., PTZ-based cameras with presets, located to monitor particular FOVs within a secured premises, perimeter, etc.

SUMMARY OF THE INVENTION

To that end, the present invention provides a video monitoring system, method of video monitoring and application software tool or function that allows an operator to identify and generate a composite operational view from a number of video sources and provide the composite view in a single view port. For example, in a security monitoring system that includes a plurality of network cameras to monitor specific fields of views at a protected location, the novel system and method provide for an end user to access and view the FOVs streaming from each network camera, and identify particular ROIs in some or all to render a composite FOV comprising the identified ROIs. The composite FOV is provided in a novel, single, composite video view port. The size and operating characteristics of the individual ROIs are also user controlled, for example, as shapes that may be defined by the end-user via an input device, e.g., trackball.

The novel method for forming the composite FOV from the multiple FOVs, and the respective ROIs therein, is simply implemented without need for complex video analytics processing functions, e.g., overlap analysis functions normally required for working with ROIs in a network camera field of view (FOV). Where a monitoring need occurs, for example, to monitor an incident captured by multiple sources that would normally be rendered and displayed as separate FOVs in a matrix viewing format, the composite FOV of the invention provides that the end-user may monitor the most important ROIs from the multiple FOVs in a single composite view, resulting in much-improved viewability and monitoring efficiency.

In one embodiment, the operator of end user creates or reconstructs the composite view by first selecting multiple camera views, or fields of view (FOVs) using a user interface. The user then selects an ROI from each selected FOV the user wishes to include in the composite FOV, e.g., a set of ROIs corresponding to a subset of FOVs, and creates the composite view by arranging the selected set of ROIs on a blank composite view palette for that purpose, in a composite FOV viewing form or layout desired.

In an alternative embodiment, the invention includes a composite view formatter function, operation of which provides for automatically deriving a composite FOV definition from a "views" database included for that purpose. A video rendering function, or video renderer, renders the composite FOV video stream on the user's monitor, which comprises streaming video from each ROI included. The operator (or end user) may therefore use the rendered streaming composite FOV as if it were a normal streaming FOV from a single video source, e.g., the composite FOV may be recorded, digitally zoomed, selective color corrected, etc.

The invention may include that any of the video sources shown therein may be mega-pixel video sources, such that when a composite view is defined (composite view definition), any mega-pixel source providing an ROI will send only the video data comprising the ROI, not the entire streaming FOV, and that the processor that renders the reconstructed composite FOV operates only on the video data of the streaming ROI. Such operation is particularly desirable in that the bandwidth required to transmit an ROI may be much smaller than that required to transmit all of the data comprising the FOV with respect to one mega-pixel video source, or like device (one ROI comprising the composite FOV). Of course where multiple mega-pixel video sources (or like devices) are supplying video data comprising ROIs (in lieu of the entire FOV), the system or network bandwidth requirements are further reduced, thereby reducing/optimizing the network traffic.

DESCRIPTION OF THE DRAWING FIGURES

The foregoing and other objects, aspects and advantages will be better understood from the following detailed description of embodiments of the inventions, with reference to the drawings, in which.

Figure 3:
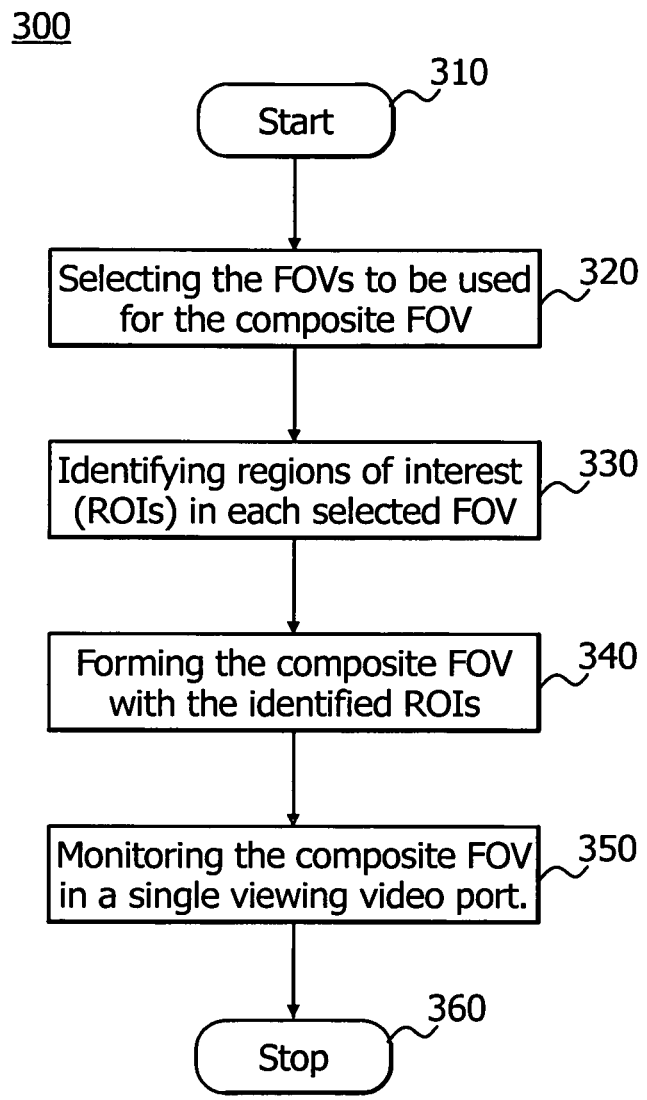
Figure 4A:
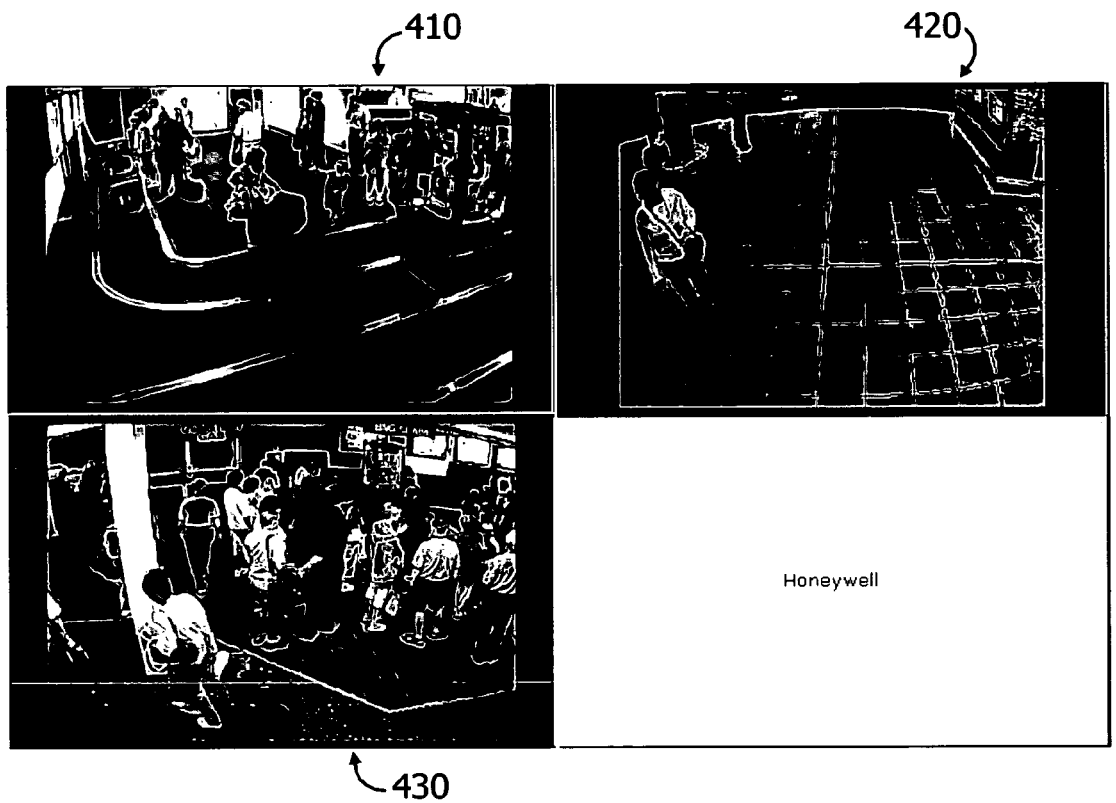
Figure 4B:
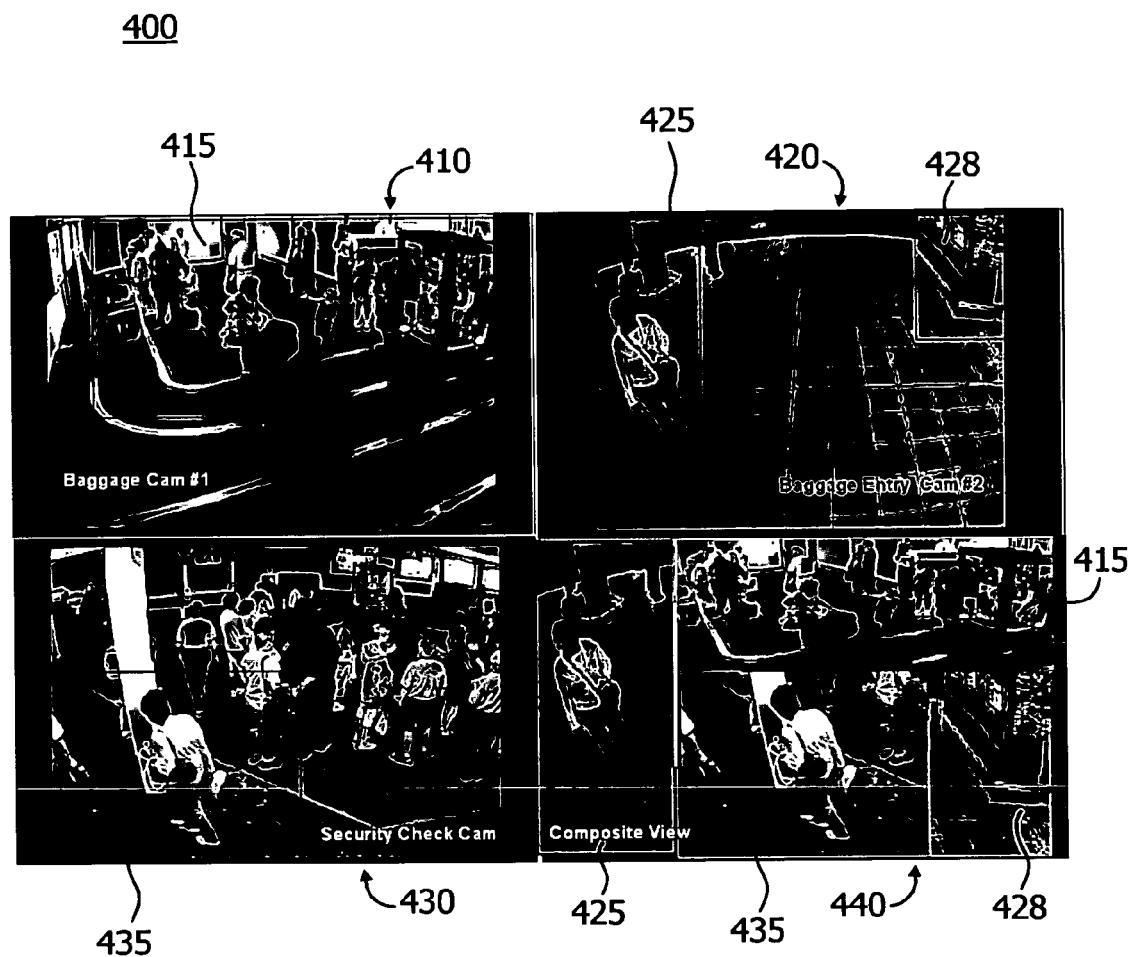
Figure 4C:
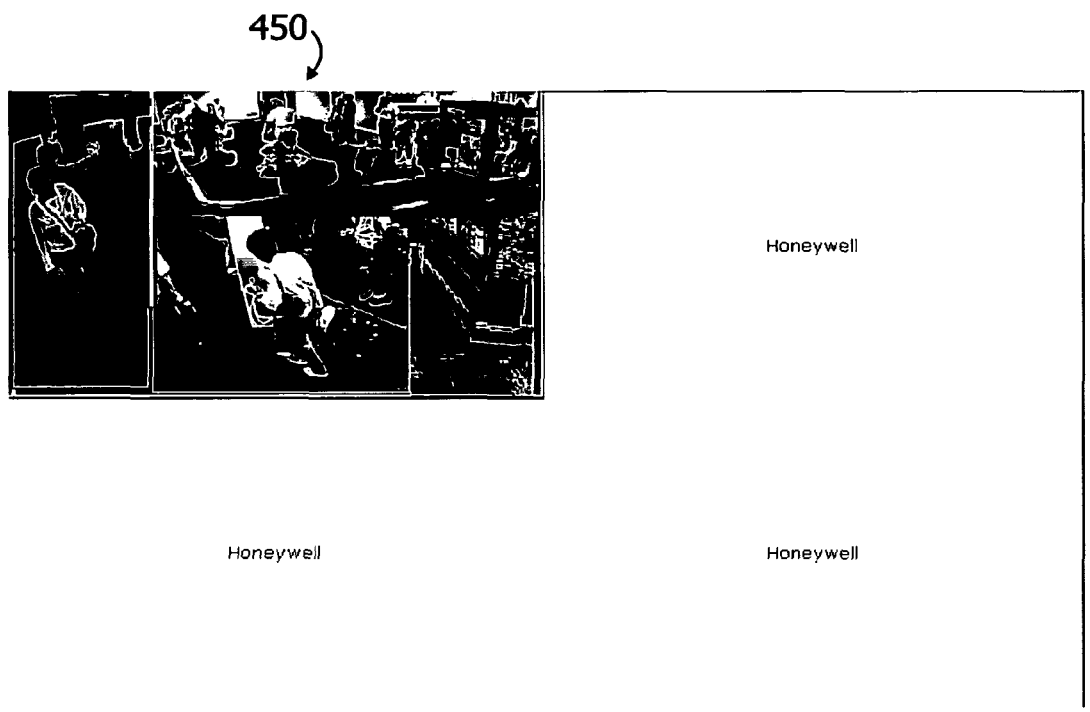

FIG. 3 is a schematic flow diagram depicting one embodiment of a method for video monitoring some portion of a plurality of fields of view (FOVs) derived from each of a plurality of video sources as a single composite FOV; and FIGS. 4a, 4b and 4c are still shots of streaming video FOVs arranged in a by-four matrix view, and a composite view formed from the streaming FOVs in accordance with the inventive operation.

DETAILED DESCRIPTION OF THE INVENTION

The inventive video surveillance system, method and application program tool of the invention are described herein with the accompanying drawings in order to convey the broad concepts of the invention. The drawings figures and textual descriptions however, are meant for illustrative purposes only, and are not meant to limit the scope and spirit of the invention, or in any way limit the scope of the invention as claimed.

In one embodiment, the present invention includes a video surveillance system that allows an operator or end user to generate and monitor a composite field of view (FOV) comprising multiple sub-views, or regions of interest (ROIs). The ROIs are identified and selected by an end-user within any FOV, which FOVs comprise the streaming video acquired by video sources comprising the video surveillance system.

More particularly, the inventive video surveillance system comprises a plurality of video sources, where each video source is arranged to monitor and acquire video surveillance data within a field of view (FOV), a video manager or controller connected to each of the plurality of video sources to control the video sources and to process video surveillance data acquired therefrom. As used with respect to the invention, "connected" means connected by any connection means known to the skilled artisan for providing an exchange of signals between a video source and a video manager or controller, or between a user interface and the video controller such as a hard wire connection, a wireless connection, etc., either directly or indirectly. For example, the connections may be hard-wired, wireless, through an intranetwork, internetwork, etc.

The video surveillance system further includes a user interface connected to the video manager that allows an end-user to control and observe the FOVs derived from each of the plurality of video sources, and identify a region of interest (ROI) within particular FOVs to control the system to dynamically render a composite FOV comprising the ROIs from the particular FOVs in a single viewing port. For that matter, certain video sources, such as Mega-Pixel cameras, and like devices, may include the inherent ability to selectively transmit the selected ROI, or ROIs from any video source providing a streaming video FOV in lieu of transmitting the entire FOV.

Figure 1:
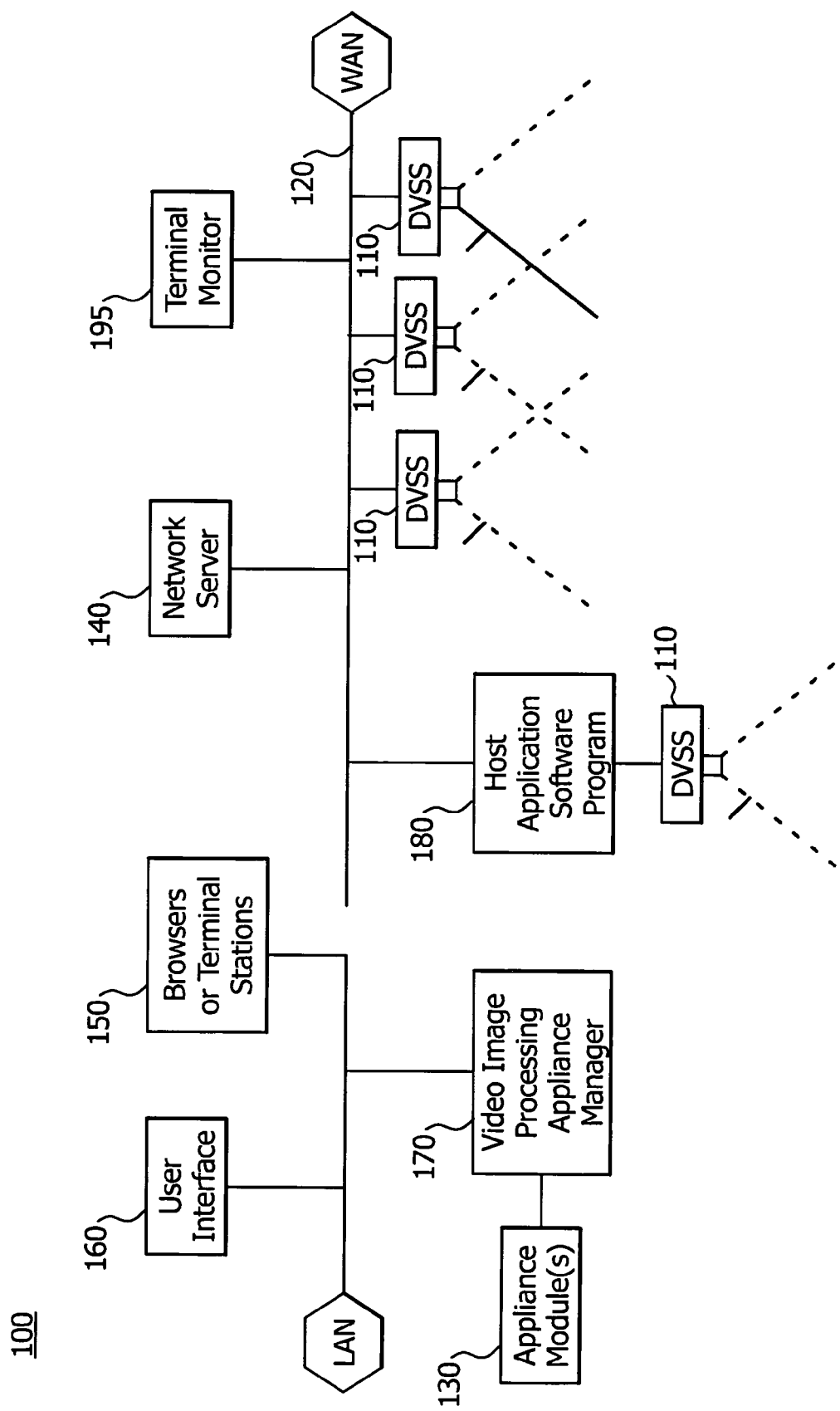
FIG. 1 is a schematic block diagram of a conventional video surveillance system that includes video analytics ability for processing video surveillance data.
Figure 2:
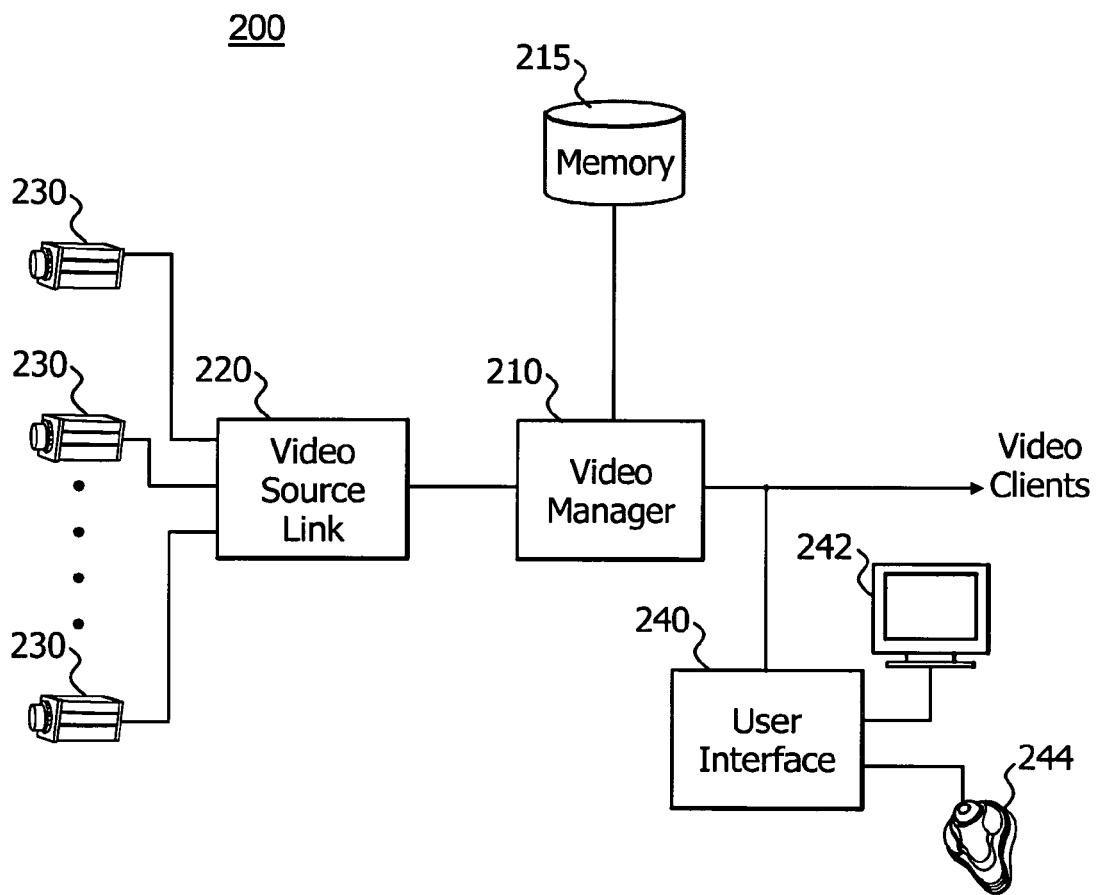
FIG. 2 is a schematic block diagram of one embodiment of a novel video surveillance system of this invention, including the novel composite operational view, or viewing port.

FIG. 2 herein describes one form of a video surveillance system 200 of the invention. System 200 includes a video manager 210 that is connected (by hard wires as shown in FIG. 2) through a video source link 220 to a plurality of video sources 230. The video manager is also connected to a user interface 240 that includes a video monitor 242 and input device 244.

To define the novel composite FOV or view, an operator or end user first selects multiple FOVs, or views from the video sources 230 for viewing on monitor 242, to choose the FOVs that he/she wishes to use in the composite FOV using the input device 244. Then the operator or end user selects an ROI area from each FOV (from the selected sources) to create the desired composite FOV by arranging the selected ROIs on blank composite view palette. Upon completing the process of arranging the desired ROIs on the composite view palette, operation allows for the composite FOV to be rendered for viewing on the video monitor 242 (as a continuous stream including video from each chosen ROI from each video source). Such operation provides for the novel and dynamic definition of ROIs, and the associated benefits of being able to monitor such operator-defined ROIs (comprising the composite FOV) in a single viewing port.

The ROIs can be defined for a video source, or a FOV derived from a video source in various 2D or 3D geometric shapes, e.g., ellipse, rectangle, circle, or may user the input device to define any ROI as a free shape, depending on the particular system limitations as understood by the skilled artisan. The processing of both the video, and the user inputs to control the novel system operation is carried out by the video manager. For that matter, as the user defines the composite FOV so described, the VM creates and stores a composite view definition, including ROI geometric data, relationship with video source FOVs and arrangement of ROIs from selected therefrom. The composite FOV definition may be recalled by the user or operator, or a different user or operator to enhance the ease of use of the novel system operation.

For that matter, certain video sources, such as Mega-Pixel cameras, and like devices, may include the inherent ability to selectively transmit the selected ROI, or ROIs from any video source providing a streaming video FOV in lieu of transmitting the entire FOV. This is particularly desirable in that the bandwidth required to transmit an ROI may be much smaller than that required to transmit all of the data comprising the FOV with respect to one meg-pixel video source (one ROI comprising the composite FOV). Of course where multiple mega-pixel video sources (or like video sources) are supplying ROIs (in lieu of the entire FOV), the bandwidth requirements are further reduced, thereby reducing/optimizing the network traffic generated. Variations on the FIG. 2 embodiment may include that any of the video sources shown therein may be mega-pixel video sources, such that when a composite view is defined (composite view definition), any mega-pixel source providing an ROI will send only the video data comprising the ROI, not the entire streaming FOV, and that the processor (e.g., a video manager) that renders the reconstructed composite FOV operates only on the video data of the streaming ROI.

A method for video monitoring a plurality of fields of view (FOVs) derived from each of a plurality of selected video sources as a single composite FOV is shown in a flow diagram 300 of FIG. 3 herein. In the figure, block 310 represents a start step for the novel method. Block 320 represents a step of selecting FOVs to be used for the composite FOV. Block 330 represents a step of identifying regions of interest (ROIs) in each selected FOV. Block 340 represents a step of forming or rendering the composite FOV with the identified ROIs. Block 350 represents a step of monitoring the composite FOV in a single viewing video port. Block 360 represents a step of ending the method.

While not included in the FIG. 3 embodiment as shown, the method 300 may include a further step of first viewing some or all of the FOVs from each video source on a video monitor whereby the end-user or operator may readily, and easily select an ROI to be included in the composite FOV definition. To that end, when the operator selects a ROI, the novel operation allows him/her to capture a representation of the selected ROI and move it onto a composite view palette, where desired. The composite view palette captures the composite FOV definition thereby. A composite view formatting function is implemented by the novel method to support the formatting of the multiple, user defined (selected) ROIs comprising the composite FOV. For that matter, the composite view formatter may store the composite view definition in a memory or database (e.g., memory 215 of FIG. 2), and provide for a user's ability to recall the composite view definition.

Once the composite FOV is rendered or provided for viewing, the novel method provides includes that each streaming ROI is seamlessly integrated with the streaming composite FOV on a video monitor. That is, the streaming composite FOV may be operated seamlessly using any known video monitoring operation, or video analytics process available to the system, as a "normal" video source FOV. For example, the normal operations may include without limitation recording the composite video FOV, digitally zooming, selectively color correcting the composite FOV or ROIs comprising the composite FOV.

FIGS. 4a, 4b and 4c are still shots within of a by-four matrix or salvo display, which together highlight operation of the selection and formation of the composite FOV from three FOVs derived from three separate video sources. That is, FIG. 4*a* shows a matrix viewing port 400 comprising 3 distinct FOVs, FOV 410, FOV 420 and FOV 430, derived from three separate video sources (not shown). FIG. 4*b* shows the FOVs 410, 420, 430, and a composite view palette 440, into which the ROIs selected from the three FOVs have been arranged. That is, ROI 415 of FOV 410, ROIs 425 and 428 from FOV 420, and ROI 435 from FOV 430. The user-defined ROIs are seen in composite FOV 440 of FIG. 4*b*. FIG. 4*c* shows the composite FOV 455 rendered from the definition shown in the composite view palette 440 of FIG. 4*b* as a normal, single viewing port 450, which port 450 is part of a matrix or salvo view 460.

As indicated hereinabove, it should be understood that the present invention could be realized in hardware, software, or a combination of hardware and software. Any kind of computer/server system(s)—or other apparatus adapted for carrying out the novel methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embodied in a computer program product, which comprises all the respective features enabling the implementation of the methods described herein, for example, the exemplary methods depicted in the figures herein, and which product—when loaded in a computer system—is able to carry out these and related methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A video surveillance system, comprising:
    a plurality of video sources, where each video source is arranged to monitor and acquire video surveillance data within a separate source field of view (FOV);
    a video manager connected to each of the plurality of video sources to control the video sources and to process video surveillance data acquired therefrom;
    a user interface connected to the video manager for displaying each of the separate source FOVs from each of the plurality of respective video sources simultaneously in a matrix view;
    a composite view formatter for processing user input entered into the user interface to define a composite FOV, the user input identifying one or more regions of interest (ROIs) displayed within one or more of the separate source FOVs displayed on the user interface; and
    a renderer for rendering the composite FOV on a blank composite view palette,
    where one or more of the separate source FOVs are separately displayed on a first portion of the matrix view and the one or more ROIs of the separate source FOVs are simultaneously displayed on a second portion of the matrix view within the blank composite view palette and
    wherein the plurality of video sources includes at least one enhanced video source that responds to the composite view formatter by forwarding only video data comprising the selected ROI within the FOV supplied by the enhanced video source.

2. The video surveillance system as set forth in claim 1, wherein the composite view formatter includes a composite view palette, wherein the one or more identified ROIs are arranged on the composite view palette.

3. The video surveillance system as set forth in claim 2, wherein the one or more ROIs may be arranged in any shape.

4. The video surveillance system as set forth in claim 1, further including a memory for storing a composite view definition.

5. The video surveillance system as set forth in claim 1, wherein the composite FOV is responsive to control signals from said video manager for controlling said video sources.

6. The video surveillance system as set forth in claim 5, wherein each ROI within the composite FOV is separately controlled.

7. The video surveillance system as set forth in claim 1, wherein the at least one enhanced video source is a megapixel camera.

8. A method for video monitoring a plurality of fields of view (FOVs) derived from each of a plurality of video sources to render a single composite FOV,
    comprising the steps of:
        processing a first user input entered into a user interface, the first user input selecting FOVs from the plurality of FOVs simultaneously displayed in a matrix view on the user interface;
        processing a second user input entered into the user interface, the second user input identifying regions of interest (ROIs) displayed within in each selected FOV displayed on the user interface; and
        rendering the single composite FOV to include the identified ROIs on a blank composite view palette,
        where one or more of the plurality of FOVs are separately displayed on a first portion of the matrix view and the identified ROIs of the selected FOVs are simultaneously displayed on a second portion of the matrix view and
        wherein at least one of the plurality of video sources is an enhanced video source that responds to the step of processing the second user input by forwarding only that video data comprising the selected ROI within the FOV supplied by the enhanced video source for use in the step of rendering.

9. The method as set forth in claim 8, further comprising a step of monitoring the composite FOV in a single viewing video port.

10. The method as set forth in claim 8, further including a step of controlling the video source from which each ROI derives using a single end-user input command.

11. The method as set forth in claim 10, wherein the step of controlling includes that each ROI from each video source is controlled using conventional video source control commands.

12. The method as set forth in claim 10, wherein the step of controlling includes that each video source may be controlled with a separate end-user input command to separately control each ROI in the rendered composite FOV.

13. The method as set forth in claim 8, wherein the step of processing the second user input entered into the user interface to identify the ROIs includes capturing the identified ROIs and moving the captured ROIs into a composite view palette.

14. The method as set forth in claim 13, wherein the step of processing the second user input entered into the user interface to identify the ROIs includes capturing a composite view definition from the composite view palette.

15. The method as set forth in claim 14, further including that the composite view definition is memory stored for subsequent recall.

16. A computer program product, comprising:
a non-transitory computer readable storage medium readable by a processing circuit and storing instructions for execution by the processing circuit for performing a method for video
monitoring a plurality of fields of view (FOVs), derived from each of a plurality of video sources
monitoring the FOVs, as a single composite FOV, the method comprising the steps of:
   processing a first user input entered into a user interface, the first user input selecting FOVs from the plurality of FOVs simultaneously displayed in a matrix view on the user interface;
   processing a second user input entered into the user interface, the second user input identifying regions of interest (ROIs) displayed within each selected FOV displayed on the user interface to create a composite FOV definition; and
rendering the single composite FOV from the FOV definition to include the identified ROIs on a blank composite view palette,
where one or more of the plurality of FOVs are separately displayed on a first portion of the matrix view and the identified ROIs of the selected FOVs are simultaneously displayed on a second portion of the matrix view and
wherein at least one of the plurality of video sources is an enhanced video source that responds to the step of processing the second user input by forwarding only that video data comprising the selected ROI within the FOV supplied by the enhanced video source for use in
the step of rendering.

17. The computer program product as set forth in claim 16, further including a step of monitoring the composite FOV in a single viewing video port.

* * * * *